United States Patent
Varney

(10) Patent No.: US 6,385,859 B1
(45) Date of Patent: May 14, 2002

(54) TOOL FOR SIMULTANEOUSLY SPACING, POSITIONING, AND ALIGNING CONSTRUCTION MATERIALS, AND METHOD OF USING SAME

(75) Inventor: Ralph Thomas Varney, Gaines, MI (US)

(73) Assignee: T&S Products, Inc., Gaines, MI (US)

( * ) Notice: Subject to any disclaimer, the term of this patent is extended or adjusted under 35 U.S.C. 154(b) by 0 days.

(21) Appl. No.: 09/513,361

(22) Filed: Feb. 25, 2000

Related U.S. Application Data

(60) Provisional application No. 60/121,985, filed on Feb. 27, 1999.

(51) Int. Cl.⁷ .................................................. B25B 11/00
(52) U.S. Cl. .............................. 33/613; 33/562; 269/43
(58) Field of Search ...................... 33/613, 526, 527, 33/562, 563, 568, 573, 645, 429, 474, 479–482, 534, 646, 647; 269/41, 43, 910

(56) References Cited

U.S. PATENT DOCUMENTS

| | | | | |
|---|---|---|---|---|
| 388,329 A | * | 8/1888 | Luce et al. ................... | 33/646 |
| 1,549,671 A | * | 8/1925 | Kridler et al. ................ | 33/613 |
| 2,315,004 A | * | 3/1943 | Painter ......................... | 33/481 |
| 2,567,586 A | * | 9/1951 | Werder ......................... | 33/562 |
| 2,835,978 A | * | 5/1958 | Krisel .......................... | 33/481 |
| 2,883,759 A | * | 4/1959 | Einbinder et al. ............. | 33/645 |
| 3,834,033 A | * | 9/1974 | Pinkard ........................ | 33/563 |
| 3,959,945 A | | 6/1976 | Allen ........................... | 52/690 |
| 4,322,064 A | | 3/1982 | Jarvis .......................... | 269/43 |
| 4,625,415 A | * | 12/1986 | Diamontis .................... | 33/613 |
| 4,843,726 A | | 7/1989 | Ward ........................... | 33/613 |
| 4,958,814 A | | 9/1990 | Johnson ....................... | 269/43 |
| 5,031,886 A | * | 7/1991 | Sosebee ....................... | 269/41 |
| 5,163,233 A | * | 11/1992 | Benson ........................ | 33/613 |
| 5,190,266 A | | 3/1993 | Barrera ........................ | 254/17 |
| 5,353,509 A | * | 10/1994 | Black ........................... | 33/451 |
| 5,364,084 A | | 11/1994 | Karash ........................ | 269/41 |
| 5,367,783 A | * | 11/1994 | Nygren ........................ | 33/613 |
| 5,407,182 A | * | 4/1995 | Hartley ........................ | 269/43 |
| 5,491,905 A | | 2/1996 | Jablonski et al. ............. | 33/613 |
| 5,771,597 A | * | 6/1998 | Hopf ............................ | 33/474 |
| 6,052,912 A | * | 4/2000 | May ............................ | 33/645 |

FOREIGN PATENT DOCUMENTS

| | | | | |
|---|---|---|---|---|
| SU | 1516-727 A | * | 10/1989 | .................. 33/562 |

* cited by examiner

Primary Examiner—Diego Gutierrez
Assistant Examiner—R. Alexander Smith
(74) Attorney, Agent, or Firm—Carrier, Blackman & Associates, P.C.; Joseph P. Carrier; William D. Blackman

(57) ABSTRACT

An improved spacing and positioning tool is provided for facilitating spacing and positioning of parallel spaced apart construction materials. The tool allows for the installation of aligned parallel spaced apart materials in either of a first or second preferred orientation thereof. Preferably, the tool is used in a set of two, which are placed proximate opposed ends of the materials being spaced, to ensure correct spacing and positioning of the workpiece materials along the length thereof. The tool includes a spacer body with a plurality of evenly spaced apart rectangular cutouts formed in a front edge thereof. The sides of the rectangular cutouts are substantially transverse to a plane defined by the front edge of the spacer body. The back edge of the spacer body has a plurality of evenly spaced apart substantially V-shaped cutouts formed therein. Optionally, a first end of the spacerbody may have a female key slot formed therein, and a second end of the spacer body may have a corresponding male key thereon to allow sequential linear connection of two or more spacer bodies together.

16 Claims, 6 Drawing Sheets

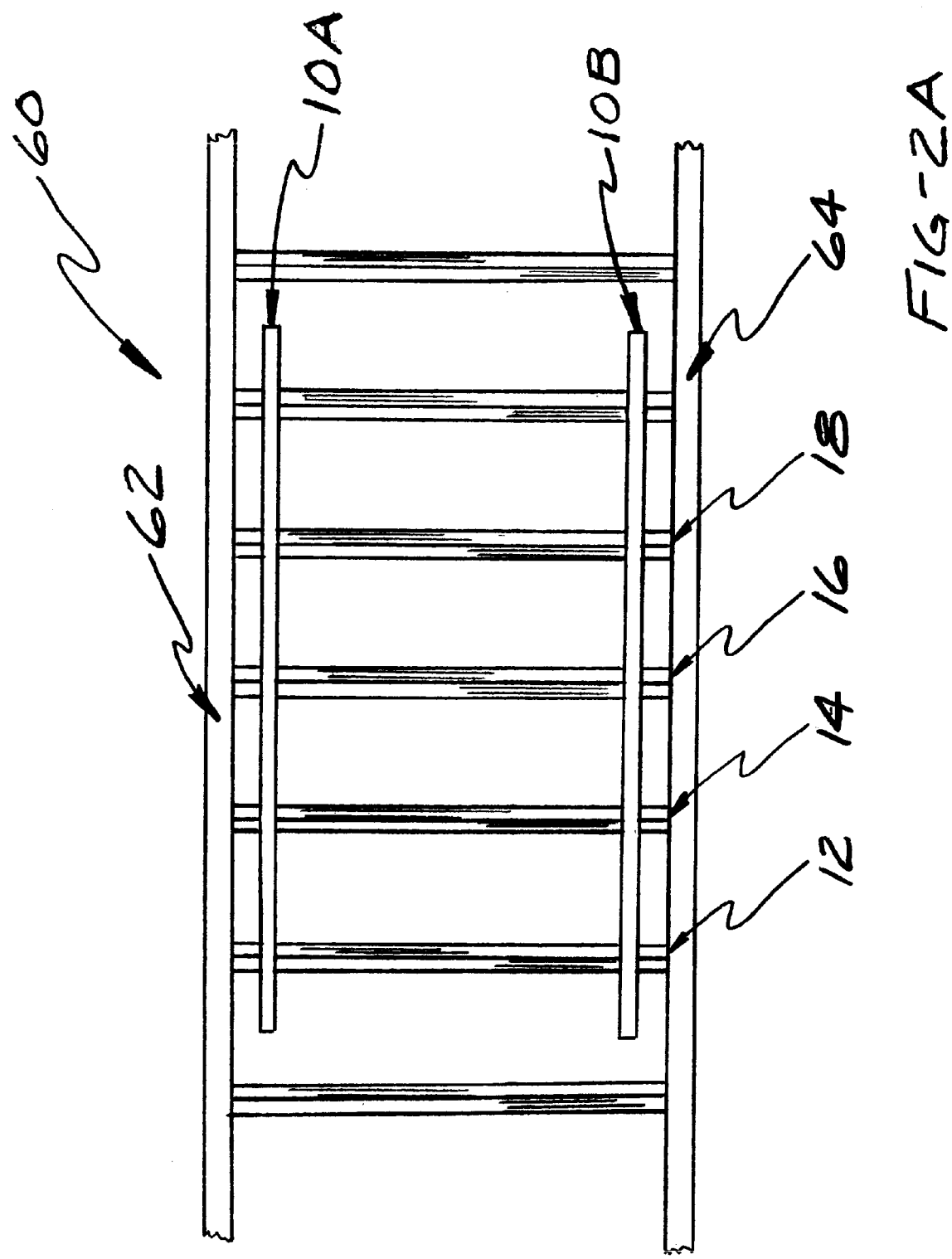

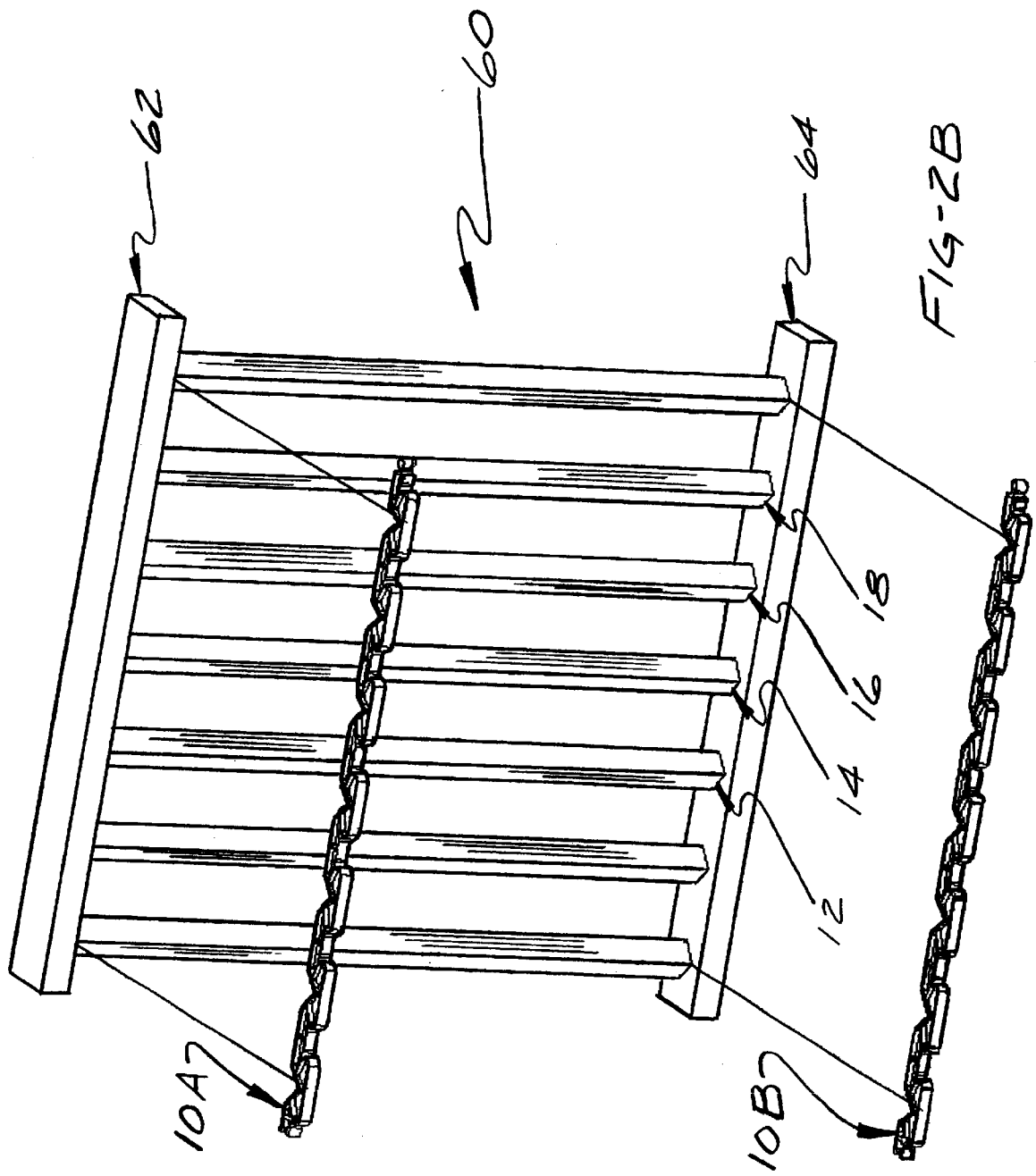

TOOL FOR SIMULTANEOUSLY SPACING, POSITIONING, AND ALIGNING CONSTRUCTION MATERIALS, AND METHOD OF USING SAME

CROSS-REFERENCE TO RELATED APPLICATIONS

The present application claims priority under 35 U.S.C. 119 of the filing date of provisional patent application Ser. No. 60/121,985, filed Feb. 27, 1999.

BACKGROUND OF THE INVENTION

1. Field of the Invention

The present invention relates to a tool for orienting structurally supportive construction materials such as, for example, wooden two-by-twos or two-by-fours. More particularly, the present invention relates to a tool for spacing multiple construction materials a fixed distance apart, while simultaneously positioning those construction materials parallel to one another in a preferred orientation thereof, and placing the materials in a straight line, with respect to one another.

2. Description of the Background Art

In the construction industry, applicable building codes, such as state building codes or the Building Officials Code Administrators (BOCA) national building code, set minimum standards for the spacing apart of structural support materials. Examples of such materials include parallel flooring support studs and vertical balustrades (spindles) for outdoor decking railing assemblies.

Workers assembling such structures could benefit from, and could save time on the job with a reliable spacer template, which would allow them to assemble components for such structures at the correct spacing and orientation thereof, to meet the applicable code. Some materials for use as spacers in the construction industry are known. Examples of these known spacers may be found in U.S. Pat. No. 3,959,945 to Allen, U.S. Pat. No. 4,322,064 to Jarvis, U.S. Pat. No. 4,420,921 Hardin, U.S. Pat. No. 4,958,814 to Johnson, U.S. Pat. No. 5,190,266 to Barrera, and U.S. Pat. No. 5,491,905 to Jablonski et al.

While the known spacers are useful for their intended purposes, a need still exists in the art for a versatile spacer device, which will allow for simultaneous aligning spaced materials at either of a first or second preferred orientation thereof.

SUMMARY OF THE INVENTION

The present invention provides an improved spacing and positioning tool for facilitating quick and easy spacing, positioning and alignment of construction materials, to place those materials in a parallel spaced apart configuration. The spacer tool according to a preferred embodiment of the present invention allows for similarly aligning and spacing a plurality of similar workpiece materials, in relation to a substrate, at either of a first or second preferred orientation thereof.

The spacing and positioning tool hereof is dimensioned, constructed and arranged to automatically center two-by-two spindles in relation to a two-by-four railing member, when the outer edge of the tool is aligned flush with the outer edge of the railing member.

Preferably, the spacer tool hereof will be used in a set of two at opposed ends of the materials being spaced, to ensure correct spacing along the length thereof.

A spacer tool in accordance with the present invention, generally, includes:
  a spacer body having a front edge, a back edge, a top, a bottom, a first end, and a second end opposite the first end;
  wherein the front edge has a plurality of evenly spaced apart first cutouts formed therein, for receiving portions of a plurality of individual construction materials therein to orient such construction materials in a first preferred orientation thereof, each of the first cutouts having a first shape;
  and further wherein the back edge has a plurality of second cutouts formed therein, the second cutouts being evenly spaced apart for receiving portions of a plurality of individual construction materials therein to orient such construction materials in a second preferred orientation.

Accordingly, it is an object of the present invention to provide a spacer tool for facilitating the alignment and spacing of supportive construction materials.

It is another object of the invention to simplify the layout of deck railing spindle spacing between constantly varying post spans while assembling outdoor decks.

It is another object of the invention to facilitate construction workers' holding a plurality of construction materials parallel to one another during the assembly process.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 2A is a side plan view of a deck railing section during assembly thereof, showing two of the spacers of FIG. 1 being used to stabilize, align, position and space apart the spindle components of a section of railing;

FIG. 2B is a perspective view of the deck railing section of FIG. 2A, showing the spacers moved away from the spindles thereof for purposes of illustration;

DETAILED DESCRIPTION OF THE PREFERRED EMBODIMENT

Overview

Figure 1:
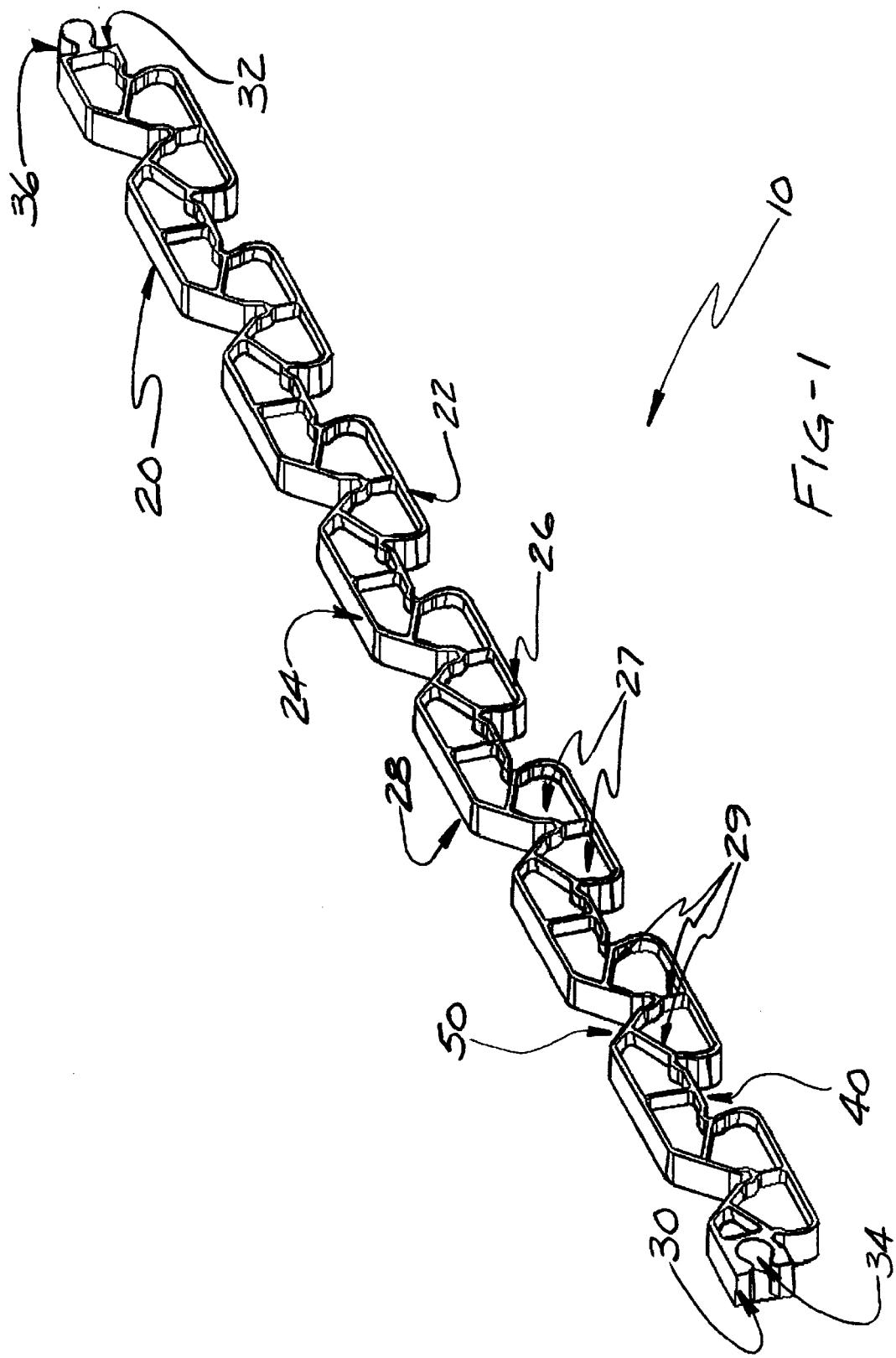
FIG. 1 is a perspective view of a spacer tool in accordance with the present invention.
Figure 3:
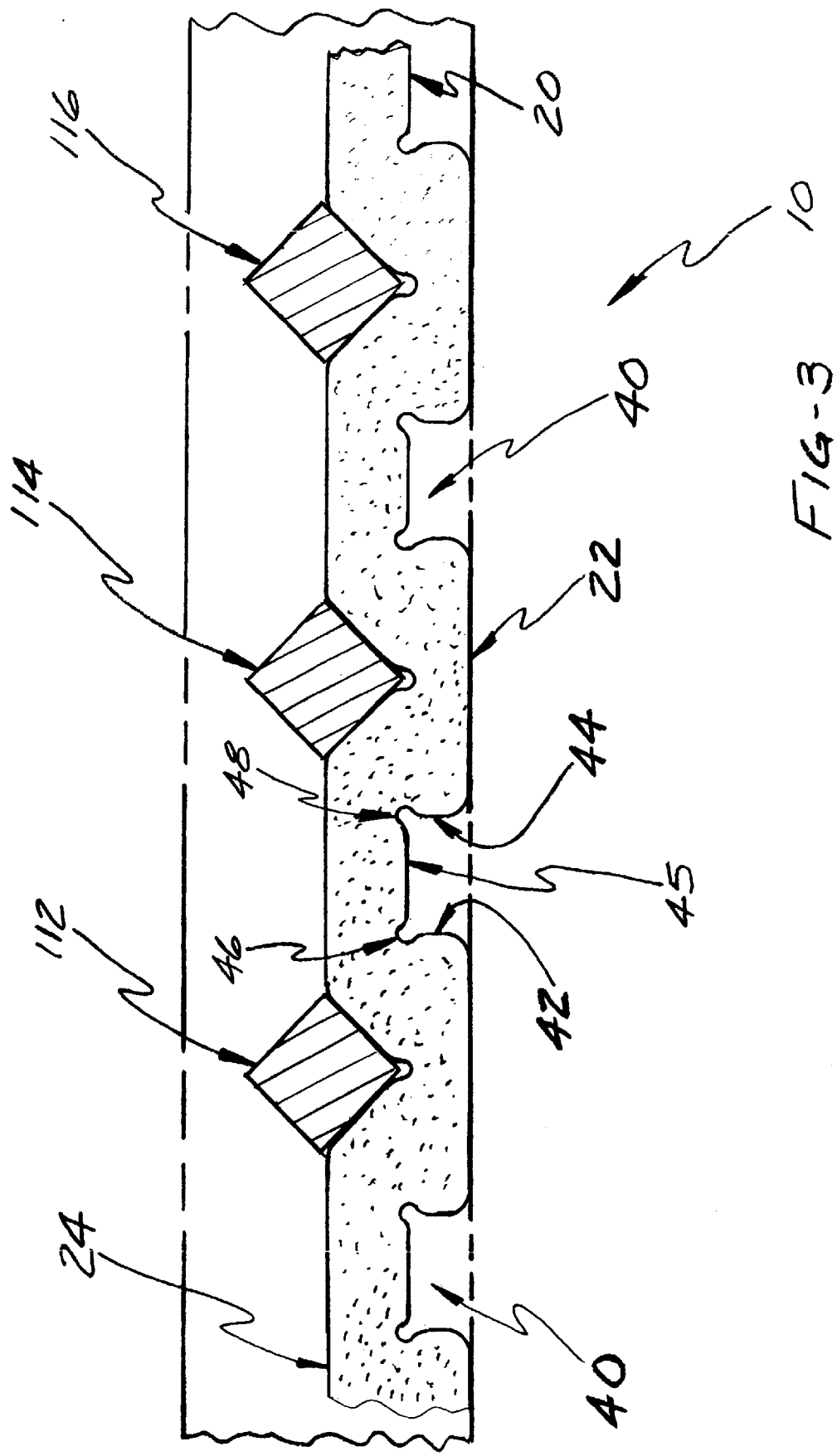
FIG. 3 is a top plan view of the spacer tool of FIG. 1 in a first use thereof to align structural workpiece members in a first configuration thereof, also showing a railing member in phantom.

Referring now to the drawings and particularly to FIGS. 1–3, a spacing and positioning tool in accordance with the present invention is shown generally at 10. For purposes of simplicity in explanation, the spacing and positioning tool 10 hereof will be referred to throughout this section of the specification as the tool 10. The tool 10 is provided for facilitating quick and easy simultaneous spacing, positioning and alignment of a plurality of construction workpiece materials, so as to place them in a parallel spaced apart configuration.

Throughout this description, relative terms like "upper", "lower", "above", "below", "front", "back", and the like are used in reference to the components of the tool 10 as oriented in the normal working position thereof, as shown in the illustration of FIGS. 2A–2B. It should be understood that these terms are used for purposes of illustration, and are not intended to limit the invention.

It will be understood that the tool 10 could be inverted or turned on its side in a particular application thereof, and if it were so inverted, or otherwise placed in an orientation different from that shown in FIGS. 2A–2B, then such relative positional terms would no longer be entirely accurate. Indeed, for purposes of illustration and explanation, the orientation of the tool 10 in FIG. 1 is shown rotated approximately 90 degrees about its longitudinal axis, as contrasted with the preferred orientation shown in FIGS. 2A–2B.

The tool 10 is particularly suitable for use in spacing, positioning and aligning balusters or spindles in outdoor deck railings, for supporting placement of the spindles below upper railing members, or between upper and lower railing members.

The tool 10 allows for simultaneous spacing, positioning and alignment of workpiece materials at either a first or second preferred orientation thereof, depending on the choice of a user. In all likelihood, whichever orientation of the workpiece materials is chosen for a particular job will be used consistently for all of the workpieces on that job, and the second orientation might be used for all of the workpieces on a second, unrelated job at a different location. This feature makes the tool 10 more versatile and useful for a building professional than a tool with only a single workpiece orientation.

Preferably, and as shown in FIGS. 2A–2B, the tool 10 is used in a set of two identical tools 10A and 10B, each of which is identical to the tool 10 of FIG. 1. The tools 10A and 10B are placed at or near opposed upper and lower ends of a plurality of substantially identical workpieces, such as those shown at 12, 14, 16, and 18 in the drawings, to ensure correct spacing, positioning and alignment of the workpiece materials at both the top and bottom ends thereof. The illustrated workpieces are part of a railing section 60 being assembled for subsequent installation in a construction project. It will be understood that when the top and bottom ends of the respective workpieces 12, 14, 16, 18 are properly spaced, positioned and aligned with respect to the horizontal railing members 62, 64, the workpieces 12, 14, 16, and 18 will be properly oriented along the entire length thereof.

In a preferred embodiment thereof, the tool 10 is constructed, arranged and dimensioned to work with standardized construction materials. For example, because of finishing operations in the lumberyard, a standard wooden workpiece commonly referred to in the art as a "two-by-four" actually measures approximately 1 and a half inches by three and a half inches. Treated lumber is slightly larger. Similarly, a finished "two-by-two" normally measures one and three-eighths inches by one and three-eighths inches. In a particularly preferred embodiment of the present invention, the tool 10 is sized and dimensioned to work with and to accommodate these standard materials, as will be further outlined herein.

The Spacer Body

The tool 10 includes a spacer body 20 (FIG. 1), which is a modified elongated rectangular member having regularly spaced cutouts 40, 50 formed in opposite sides thereof, as will be further detailed below.

The spacer body 20 may be made of any durable material, but is preferably made of a strong, durable and weather-resistant rigid plastic such as polyethylene, acetal, or other appropriate plastic known in the art. The material for the spacer body 20 should be selected to be stable over the temperature range normally encountered at construction sites, and should be suitably tough so as to be capable of being stored with other tools, and to be able to withstand inadvertent contact with such other tools without appreciable damage thereto.

The spacer body 20 has a front edge 22, a back edge 24, a top 26, a bottom 28, a first end 30, and a second end 32 opposite the first end. The top 26 and bottom 28 of the spacer body 20 are substantially identical mirror images of one another, and may each have a plurality of Optionally, the spacer body may have a hollow indentation 56 formed therein at the base of each V-shaped cutout 50, as shown, to accommodate workpiece irregularities or rough edges. The V-shaped cutouts 50 are provided for receiving corresponding corner portions of a plurality of individual construction materials having a square or rectangular cross-section, such as the wooden two-by-twos 112, 114, 116 shown in FIG. 3 therein, to space such materials a predetermined distance apart in line with one another, and simultaneously to orient and position such construction materials parallel to one another and disposed at an angle with respect to the plane defined by the back edge 24 of the spacer body 20. The result of this orientation of the workpieces 112, 114, 116 is that they are decoratively oriented at an angle with respect to a top railing member, suggested by the phantom lines in FIG. 3.

Figure 4:
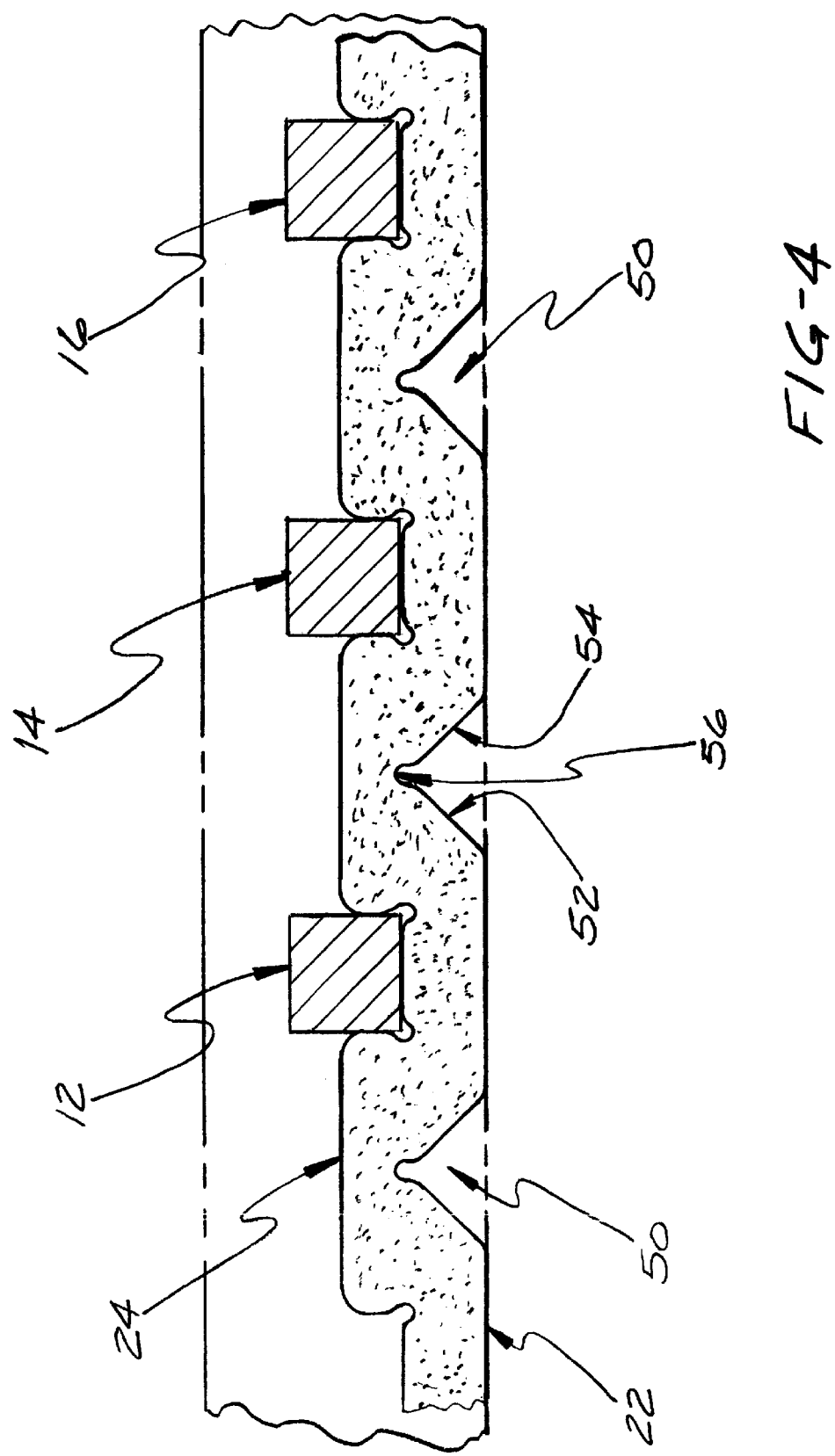
FIG. 4 is a top plan view of the spacer tool of FIG. 1 in a second use thereof to align structural workpiece members in a second configuration thereof, also showing a railing member in phantom.

Referring again to FIGS. 3–4, the front edge 22 of the spacer body 20 has a plurality of evenly spaced apart substantially square U-shaped cutouts 40 formed therein. The substantially square U-shaped cutouts 40 are provided for receiving portions of a plurality of individual construction workpiece materials having a square or rectangular cross-section, such as the wooden two-by-twos 112, 114, and 116 shown in FIG. 4, therein, to place such materials a predetermined distance apart in line with one another, and to simultaneously orient such construction materials in a straight line with the sides thereof parallel to one another, and substantially transverse to the plane defined by the front edge of the spacer body. The substantially square U-shaped cutouts 40 are substantially identical to one another and each have the same shape and size.

As used throughout the present specification, the term "square" is not intended to mean that all three sides 42, 44, 45 of the cutout 40 are exactly equal in length, but rather, is intended to suggest that the openings formed by the cutouts are rectangular and are roughly square-looking in shape and appearance, to the casual observer; and that the substantially square U-shaped cutouts, rather than being rounded in the corners thereof like the letter U, instead substantially define right angles between adjacent sides 44, 45 thereof.

The opposed side walls 42, 44 of the spacer body 20, in each of the substantially square U-shaped cutouts 40, are substantially transverse to a plane defined by the front edge 22 of the spacer body 20. The recessed interior wall 45 of the spacer body 20, in each of the substantially square U-shaped cutouts 40, is parallel to the plane defined by the front edge 22 of the spacer body 20, as shown. Optionally, the spacer body may have hollow indentations 46, 48 formed therein at the inside corners of the substantially square U-shaped cutouts 40, as shown, to accommodate workpiece irregularities or rough edges.

Tool Dimensions in the Preferred Embodiment

Because of the specialized nature of the work this tool 10 is designed for, the specific dimensions of the tool may become significant, particularly in relation to a tool intended for use in assembling outdoor deck railing sections 60.

In the preferred embodiment of the tool 10, each of the transverse side walls 52, 54 is approximately one and three-eighths inches long to receive a side of a standard two-by-two there against.

Also in the preferred embodiment of the tool 10, the back wall 45 of each of the U-shaped cutouts is approximately one and three-eighths inches long to receive a side of a standard two-by-two there against, and the side walls 42, 44 of the substantially square U-shaped cutouts 40 are spaced one and one-half inches apart to receive a standard two-by-two therebetween, and adjacent cutouts 40, 40' are spaced with the centers thereof approximately three and three-eighths inches apart, so that when adjacent two-by-two workpieces are assembled therewith, they will meet the BOCA code specification that a four-inch sphere will not be able to pass between them.

Also in the preferred embodiment of the tool 10, the preferred width W (FIG. 3) of the spacer body 20 between the front and back edges 22, 24 thereof is made to be one and three-fourths inches, exactly half of the width of a standard two-by-four. By making the spacer body 20 half as wide as a standard finished two-by-four, when the front edge 22 of the tool 10 is lined up flush and even with a front edge of a two-by-four to be used as a railing member 62 (shown in phantom in FIG. 3), the back edge 24 of the tool will lie along the center line of the railing member. The depth of the cutouts 40, 50 is configured, arranged and dimensioned so that when workpieces, such as, for example, those shown at 12, 14, and 16 are placed into the cutouts, the workpieces will be placed in a straight line relationship, with the centers thereof lined up along the center line of the railing member. (It will be understood that the above dimensions are given as an illustrative example of dimensions in a preferred embodiment intended for use with two-by-two railing spindles, and that the invention may be adapted for use in different applications, in which case the measurement specifications would change.)

This configuration is helpful to a worker using the tool 10, as it allows the worker to more quickly and easily center, align, and space the workpieces 12, 14, 16 than is possible without the tool. By using the tool 10, the worker is assisted in placing the workpieces in a desired configuration thereof, oriented in proper relation to one another below a railing member 62, without requiring time-consuming measurements. The tool 10 according to the present invention greatly increases the speed of a worker, particularly after the worker gains familiarity with the tool and the method of using it.

Figure 5:
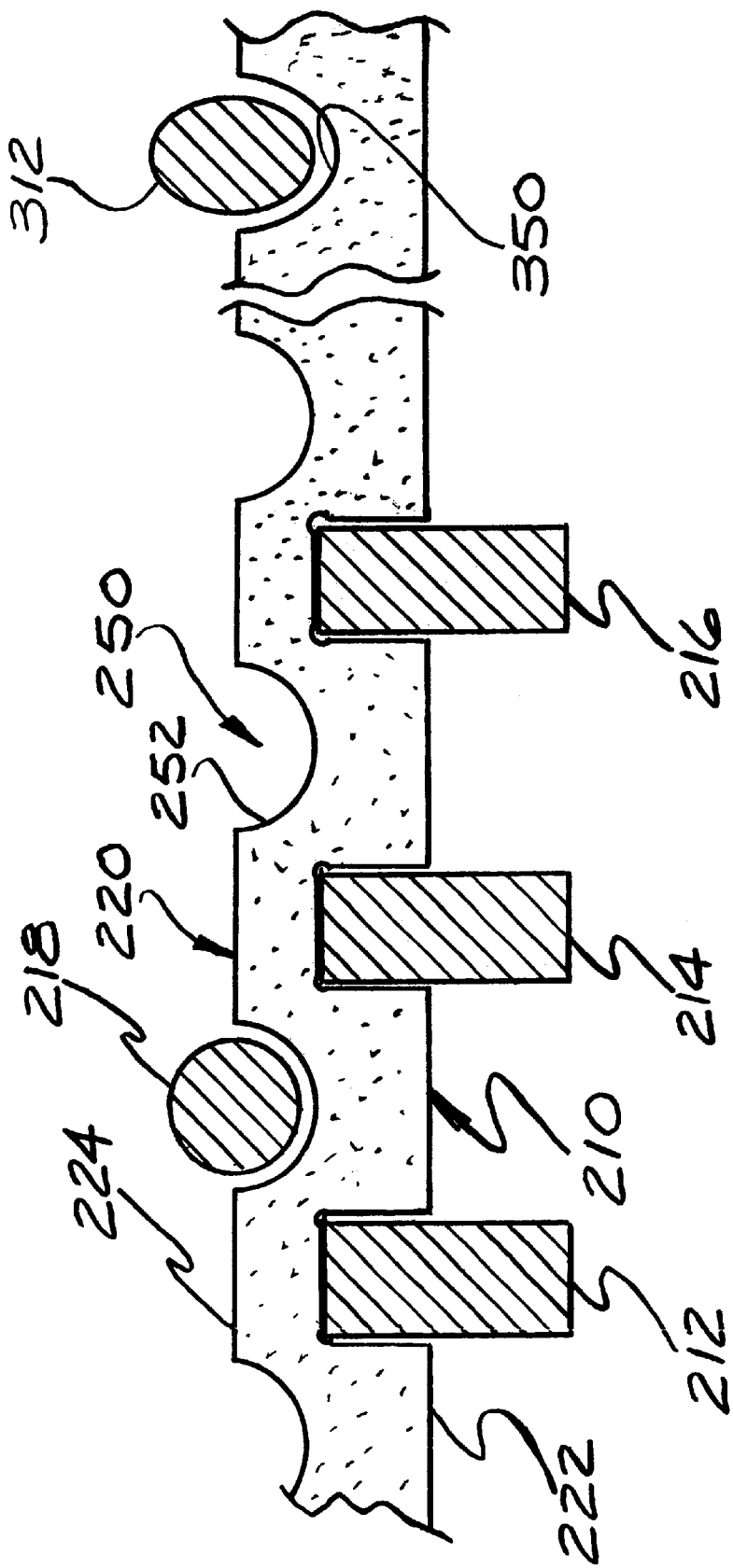
FIG. 5 is a top plan view similar to FIG. 3, showing use of the spacer tool with a modified workpiece having a different cross-sectional shape than the workpiece of FIG. 3.

The tool 10 hereof is not limited to being used with square two-by-twos, but may also be used with two-by-fours 212, 214, 216, such as those illustrated in FIG. 5.

FIG. 5 shows an alternative embodiment of a tool 210 in accordance with a second embodiment of the invention. In this second embodiment, the tool 210 is substantially identical to the tool 10 as discussed herein, except that in this embodiment, rather than the back edge 224 of the spacer body 220 having V-shaped cutouts as in the first embodiment, instead, the back edge 224 has semi-circular cutouts 250 formed therein, having a curved inner surface 252 for receiving and positioning a workpiece 218 having a circular cross-section. This workpiece 218 may be a lathe-turned post member or a cylindrical dowel post having a constant cross-sectional diameter. Another alternative is shown in the section on the right in FIG. 5 which illustrates a half-oval cutout 350 for use with a workpiece 312 having an oval cross-sectional shape. Other shapes may be used as cutouts in accordance with the invention, and where so used, the shape and dimensions of the cutout sections would be adjusted accordingly.

Using the Spacing and Positioning Tool

As one illustrative use of a tool 10 according to the invention, the use thereof in building a section of wooden railing as a prefabricated assembly 60, for an outdoor deck, is given as an example in this section. The use of this example is provided to illustrate one application of the tool 10, and is not intended to limit the scope or possible application of the invention.

In building such a railing assembly 60, first, top and bottom horizontal railing members 62, 64, respectively, are cut to the preferred length thereof. The value for the total length of the horizontal section is divided in half, and a mark is made at each of the midpoints of the top and bottom horizontal railing sections.

Then, the top and bottom railing sections 62, 64 are placed, resting on edge on a flat horizontal work surface, with the respective midpoints facing one another. Beginning at the center cutout notch 40 or 50 of two identical tools 10a, 10b hereof, the tools are lined up with the center cutout notch thereof aligned with the midpoints of the horizontal railing sections 62, 64. A spindle or balustrade workpiece is then placed in alignment in the center cutout notches of each of the tools 10a, 10b, and an additional spindle workpiece is placed in alignment in each of the other cutout notches, working from the center towards the outer ends 30, 32 of the spacer body 20.

Once all of the spindle workpieces such as that shown at 12, 14, 16, and 18 (FIGS. 2A–2B) are properly aligned in their chosen cutouts, they can be attached to the upper and lower horizontal railing sections 62, 64 using appropriate fasteners, such as nails or screws. Where outdoor decking is being fabricated, the fasteners should be selected to be weather-resistant and of a type which is not susceptible to oxidation when exposed to the elements. Once the spindles are securely fastened in place to the horizontal railing sections 62, 64, then the tools 10A, 10B may be removed therefrom and repositioned, placing the outermost spindle, which is securely fastened to the horizontal railing sections 60, 62, into the innermost cutout notch 40 or 50 of the spacer body, and working outwardly on the railing sections 62, 64 in this way until all available spaces are filled. The rail section 60 is now finished and is ready to install in place between appropriate newel posts.

The tool 10, as shown and described herein, is also usable to install staged vertically oriented balustrades, at the sides of an ascending stairway, below an angled railing member.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having, thus, described the invention, what is claimed is:

1. A spacing and positioning tool for aiding a worker in orienting a plurality of parallel spaced-apart workpieces, said tool comprising: a unitary spacer body having a front edge, a back edge, a top, a bottom, a first end, and a second end opposite the first end;

wherein the spacer body has a plurality of first cutouts formed therein along the front edge thereof for receiving portions of a plurality of individual workpieces therein, the first cutouts being evenly spaced apart and having a first shape;

and further wherein the spacer body has a plurality of second cutouts formed therein along the back edge thereof for receiving portions of a plurality of individual workpieces therein, said second cutouts being evenly spaced apart and having a second shape which is different from said first shape.

2. The tool of claim 1, wherein the top and bottom of the spacer body have a plurality of hollowed out sections thereon, which define reinforcement ribs therebetween.

3. The tool of claim 1, wherein the first end of the spacer body has a hollow key slot formed therein, and the second end of the spacer body has a corresponding key formed thereon which fits engagingly into the key slot of a second identical spacer body, to allow sequential linear connection of two or more spacer bodies together.

4. The tool of claim 1, wherein each of the cutouts includes at least one cutout corner, and wherein the spacer body has a hollow indentation formed therein at each of the cutout corners.

5. A spacing and positioning tool for aiding a worker in orienting a plurality of parallel spaced-apart workpieces, said tool comprising:

a spacer body having a front edge, a back edge, a top, a bottom, a first end, and a second end opposite the first end;

wherein the spacer body has a plurality of substantially rectangular cutouts formed therein along the front edge thereof for receiving portions of a plurality of individual workpieces having a rectangular cross-section, the substantially rectangular cutouts being evenly spaced apart and defining interior side walls in the spacer body which are disposed substantially transverse to the spacer body front edge;

and further wherein the spacer body has a plurality of substantially V-shaped cutouts formed therein along the back edge thereof for receiving portions of a plurality of individual construction materials therein, said V-shaped cutouts being evenly spaced apart and defining interior side walls in the spacer body which are disposed at an angle with respect to the spacer body back edge.

6. The tool of claim 5, wherein the top and bottom of the spacer body have a plurality of hollowed out sections thereon, which define reinforcement ribs therebetween.

7. The tool of claim 5, wherein the first end of the spacer body has a hollow key slot formed therein, and the second end of the spacer body has a corresponding key formed thereon which fits engagingly into the key slot of a second identical spacer body, to allow sequential linear connection of two or more spacer bodies together.

8. The tool of claim 5, wherein each of the defining interior side walls in the spacer body at the V-shaped cutouts is disposed at a 45 degree angle with respect to the spacer body back edge.

9. The tool of claim 5, wherein each of the cutouts includes at least one cutout corner, and wherein the spacer body has a hollow indentation formed therein at each of the cutout corners.

10. A spacing and positioning tool for aiding a worker in orienting a plurality of parallel spaced-apart workpieces, said tool comprising:

a unitary spacer body having a front edge, a back edge, a top, a bottom, a first end, and a second end opposite the first end;

wherein the spacer body has at least three substantially identical cutouts formed therein along the front edge thereof for receiving portions of a plurality of individual workpieces therein, the cutouts being evenly spaced apart and having a shape corresponding to a cross-sectional shape of a workpiece;

and further wherein the spacer body has a defined width between the front edge and the back edge, said width chosen to be half of a width of a substrate to be attached to said workpiece, so as to allow centering of said workpieces with respect to said substrate.

11. The tool of claim 10, wherein said spacer body width is one and three-fourths inches.

12. The tool of claim 10, wherein said cutout includes a right angle.

13. The tool of claim 12, wherein each of the cutouts includes at least one cutout corner, and wherein the spacer body has a hollow indentation formed therein at each of the cutout corners.

14. The tool of claim 10, wherein the top and bottom of the spacer body have a plurality of hollowed out sections thereon, which define reinforcement ribs therebetween.

15. The tool of claim 10, wherein the first end of the spacer body has a hollow key slot formed therein, and the second end of the spacer body has a corresponding key formed thereon which fits engagingly into the key slot of a second identical spacer body, to allow sequential linear connection of two or more spacer bodies together.

16. A method of assembling a railing section, comprising the steps of:

placing first and second horizontal railing members into a parallel spaced apart configuration;

placing a series of vertical railing members between the horizontal railing members;

placing a spacing and positioning tool according to claim 1 proximate each horizontal railing member and between the first and second horizontal railing members;

aligning one of said series of vertical railing members with one of said cutouts in each of the spacing and positioning tools such that the vertical railing members are substantially parallel to one another; and attaching each of the vertical railing members to each of the first and second horizontal railing members.

* * * * *